United States Patent [19]
Orolin et al.

[11] Patent Number: 5,766,929
[45] Date of Patent: Jun. 16, 1998

[54] COMPOSITIONS AND METHOD FOR BIOREMEDIATION OF HALOGEN CONTAMINATED SOILS

[75] Inventors: John J. Orolin, The Village of Wilmette; James G. Frycek, The Village of Skokie, both of Ill.; Bruce C. Hemming, Manchester, Mo.

[73] Assignee: Inland Consultants, Inc., Skokie, Ill.

[21] Appl. No.: 844,026

[22] Filed: Apr. 18, 1997

Related U.S. Application Data

[63] Continuation of Ser. No. 383,790, Feb. 6, 1995, abandoned.

[51] Int. Cl.$^6$ .................................................. D06M 16/00
[52] U.S. Cl. .................... 435/262; 435/262.5; 435/264; 210/611
[58] Field of Search .......................... 435/262, 262.5, 435/264; 71/6, 9, 10, 903; 210/610, 611, 747

[56] References Cited

U.S. PATENT DOCUMENTS

| | | | |
|---|---|---|---|
| 3,634,272 | 1/1972 | Valenta et al. | 252/153 |
| 4,297,122 | 10/1981 | Wallace | 71/12 |
| 4,385,121 | 5/1983 | Knowlton | 435/244 |
| 4,877,736 | 10/1989 | Fliermans | 435/183 |
| 4,925,802 | 5/1990 | Nelson et al. | 435/262 |
| 5,006,250 | 4/1991 | Roberts et al. | 210/610 |
| 5,024,949 | 6/1991 | Hegeman et al. | 435/262 |
| 5,071,755 | 12/1991 | Nelson et al. | 435/167 |
| 5,196,121 | 3/1993 | Moore et al. | 210/603 |
| 5,200,343 | 4/1993 | Cole et al. | 435/262.5 |
| 5,277,815 | 1/1994 | Beeman | 210/605 |
| 5,279,740 | 1/1994 | Basile et al. | 210/610 |
| 5,316,940 | 5/1994 | Georgiou et al. | 435/252.1 |
| 5,340,376 | 8/1994 | Cunningham | 71/6 |
| 5,593,888 | 1/1997 | Glaze et al. | 435/262.5 |

*Primary Examiner*—Ralph Gitomer
*Attorney, Agent, or Firm*—Haverstock, Garrett & Roberts

[57] ABSTRACT

The present invention is for bioremediation method and compositions for promoting activity in indigenous micro-organisms, causing the micro-organisms to degrade organic contaminants. The bioremediation compositions are provided by admixing an amount of a sulfate salt to achieve from about 75 to about 250 parts per million in the contaminated soil, with a sufficient amount of an iron derivative to achieve from about 30 to about 100 parts per million in the contaminated soil, a sufficient amount of an electron donor to achieve from about 50 to about 75 parts per million in the contaminated soil, from about 1 to about 5 grams per liter of a yeast extract, from about 1 to about 5 grams per liter of a glacial till, a sufficient amount of a nitrogen compound to equal a concentration ratio of 100 parts of indigenous carbon to from about 5 to about 20 parts by weight of the nitrogen compound in the contaminated soil, a sufficient amount of a phosphorus compound to equal a concentration ratio of 100 parts by weight of indigenous carbon to 1 part by weight of the phosphorus compound within the contaminated soil. The bioremediation compositions may further include a surfactant, a muriate of potash and a compost. The micro-organisms are chosen from a group consisting of facultative, aerobic and/or anaerobic bacteria. The bioremediation compositions formulated in accordance with the present invention are applied to the soil resulting in the degradation of halogenated aliphatic and aromatic contaminants and the non-detection of vinyl chloride.

11 Claims, No Drawings

5,766,929

1

COMPOSITIONS AND METHOD FOR BIOREMEDIATION OF HALOGEN CONTAMINATED SOILS

This application is a continuation of application Ser. No. 08/383,790 filed on Feb. 6, 1995 now abandoned.

FIELD OF THE INVENTION

The present invention relates to an in-situ bioremediation method and compositions for the activation of indigenous micro-organisms to degrade hazardous and toxic contaminants located in contaminated groundwater and soil. More specifically, the present invention utilizes novel bioremediation compositions containing various constituents, deployed in the contaminated area, to stimulate indigenous anaerobic, aerobic and facultative bacteria to degrade halogenated aromatic and aliphatic contaminants.

BACKGROUND OF THE INVENTION

The historical use and improper storage, handling and disposal of hazardous and toxic contaminants, specifically halogenated aromatic and aliphatic compounds, has resulted in the widespread contamination of soils and groundwater. Left untreated these contaminants will remain hazardous for many years.

Bioremediation compositions which utilize micro-organisms to destroy hazardous or toxic waste have been heretofore known. Specifically, bioremediation compositions have heretofore been used to degrade organic contaminants, such as halogenated aromatics and aliphatics, located in the soil and groundwater by stimulating the indigenous micro-organisms. Typically, the bioremediation compositions contain a blend of nutrients such as a yeast extract containing amino acids and vitamins, as well as a selected for mutant bacteria capable of degrading the organic contaminants, and other additives such as electron acceptors and sulfates for stimulating either the indigenous wild type micro-organisms or the selected for mutant bacteria.

In addition to a wide variety of bioremediation compositions, a wide variety of methods for delivery of the bioremediation compositions have been used to place the bioremediation compositions into contaminated areas. The prior art includes drilling a series of wells into the earth and then pumping in nutrients and steam to activate the indigenous organisms. Another method includes removing the contaminated soil and mixing the soil with a bioremediation composition in a mixing chamber. After the bioremediation composition and the contaminated soil are mixed, the remediated soil is returned back to the site from which it was removed.

Previous compositions have suffered from numerous problems. Examples of such problems are: the compositions do not degrade the halogenated compounds to acceptable site specific promulgated state environmental standards; the activated micro-organisms convert the contaminants into vinyl chloride, a more hazardous compound than the initial contaminants; and the stimulated micro-organisms require too much time to degrade the contaminants. Furthermore, the prior bioremediation compositions were not designed to be responsive to prevailing nutrient and moisture conditions in the contaminated soil, nor to varying populations of indigenous micro-organisms.

The inadequacies of the known prior art processes and compositions are overcome by the present invention.

SUMMARY OF THE INVENTION

This invention relates to a mixture of constituents which unexpectedly promote a high level of growth in indigenous

2 micro-organisms, more specifically, anaerobic, aerobic and facultative bacteria, in contaminated soil and groundwater. Furthermore, the present invention readily activates the indigenous bacteria to degrade halogenated contaminants. The contaminants in the soil are generally halogenated aromatic and aliphatic compounds. Specific examples of the halogenated contaminants include tetrachloroethylene (PERC), trichloroethene (TCE), trichloroethane (TCA) and 1,2dichlorobenzene.

The primary constituents of the bioremediation compositions of this invention comprise a mixture having a sufficient amount of sulfate salts to achieve a range from about 75 to about 250 parts per million (ppm) by weight in the contaminated soil, a sufficient amount of iron derivatives to achieve a range from about 30 to about 100 ppm by weight in the contaminated soil, a sufficient amount of electron donors to achieve a range from about 50 to about 75 ppm by weight in the contaminated soil, yeast extracts added in an amount of from about 1 to about 5 grams per liter of solution, glacial tills added in an amount of from about 1 to about 5 grams per liter of solution, a sufficient amount of a nitrogen compound to equal a concentration ratio in the contaminated soil of 100 parts by weight of indigenous carbon to from about 5 to about 20 parts by weight of the nitrogen compound, and a sufficient amount of a phosphorous compound to equal a concentration ratio in the contaminated soil of 100 parts by weight of indigenous carbon to 1 part by weight of the phosphorous compound. The bioremediation compositions may further include a compost equaling from about 10 to about 15% of the total cubic yards of the contaminated soil to be remediated. Furthermore, the bioremediation compositions may include in solution from about 1 to about 5 parts by volume of a surfactant. The bioremediation compositions may also include in solution from about 0.125 to about 0.5 grams per liter of a muriate of potash. Indigenous micro-organisms are required to remediate the contaminated soil and are typically selected from a group of bacteria including anaerobic, aerobic and facultative bacteria. The bioremediation compositions appear to most effectively remediate the contaminated soil when bacteria of the genus Acinetobacter or Serratia are present. More specifically, certain strains of the species *Acinetobacter johnsonii* and/or *Serratia marcescens* appear to be the most effective remediaters of the contaminated soil.

The bioremediation compositions may be delivered to the contaminated site in a solution form, a solid dry mix form or a combination of the two forms.

The bioremediation compositions provide excellent results for the remediation of contaminated soil and groundwater. As a result of the use of the bioremediation compositions halogenated contaminants are degraded to acceptable promulgated standards, degradation of the halogenated contaminants occurs in a shortened time period, and, delivery of the bioremediation compositions is readily achieved. Furthermore, the bioremediation compositions stimulate the indigenous bacteria populations to expand allowing for a greater amount of the contaminants to be metabolized. Importantly, the by-product of the metabolic processes of the indigenous bacteria is ethane and/or ethene as opposed to vinyl chloride, a greater health hazard than the degraded contaminants.

DETAILED DESCRIPTION OF THE PREFERRED EMBODIMENT

The present invention provides for an in-situ bioremediation method and compositions for accelerating the biomediation of halogenated aliphatic and aromatic contaminated soils and ground water. The present invention provides for a thorough degradation of the contaminants in the soil and does not result in the final detectable production of a vinyl monomer such as vinyl chloride. Also, the present invention is advantageous as it results in a faster degradation of the contaminants.

PREPARATION OF THE BIOREMEDIATION COMPOSITIONS

The present invention provides bioremediation compositions for promoting the growth of indigenous microorganisms, more specifically indigenous bacteria, which degrade halogenated aliphatic and aromatic compounds in contaminated soil and groundwater. The bioremediation compositions of the present invention promote an increased rate of degradation of the halogenated contaminants as well as prevent the formation of detectable amounts of vinyl chloride as a by-product emitted by the indigenous bacteria. The indigenous bacteria typically produce ethane and/or ethene as a by-product of metabolism, as opposed to the release of vinyl monomers such as vinyl chloride. The bioremediation compositions may be applied to the contaminated soil either in a solution and/or in a solid dry mix form. The formulations for the bioremediation compositions, will consist essentially of iron derivatives, sulfate salts, glacial tills, yeast extracts, phosphorus compounds, nitrogen compounds and electron donors. Once the bioremediation compositions are formulated, pursuant to a degradation study, they are then introduced to the contaminated site with the bioremediation compositions effectively stimulating the indigenous bacteria population to expand and to degrade the halogenated contaminants into ethane and/or ethene.

The bioremediation compositions in solution are the preferred form for the application of the bioremediation compositions to the contaminated soil. The bioremediation compositions in solution are generally the bioremediation constituents dissolved in either tap, lake, river or distilled water to form bioremediation solutions. While the bioremediation solutions are preferred, the dry mix may be an effective form of delivery of the bioremediation constituents. The bioremediation dry mix compositions may be made into a powder, pelletized or any other acceptable form for adequately delivering the bioremediation compositions to the contaminated site. Regardless of whether the bioremediation compositions are added in solution, dry mix or a combination thereof, it is important that a sufficient amount of the bioremediation constituents are added to the contaminated site.

A useful glacial till is commercially available as BIO 2 Biological Activator sold by Meridian Environmental Group, Inc. of Davisburg, Mich., and is initially in a powder form. The glacial tills are comprised of diatomaceous earth and siliceous skeletons and provides essential elemental compounds necessary to the growth of the indigenous bacteria and remediation of the halogenated contaminants. Included in the constituents of the BIO 2 Biological activator are magnesium, phosphorous, manganese, cobalt, molybdenum and iron. However, it is believed that all metals of the periodic table may be included in the glacial tills. The amount of the glacial tills sufficient to stimulate growth and remediation activity in the indigenous bacteria may vary widely. However, the glacial tills will generally be added to the bioremediation compositions in an amount of from about 1 to about 5 grams per liter of the bioremediation solution. Instead of adding the glacial tills to the contaminated soil in one of the bioremediation solutions, the glacial tills may be spread onto the contaminated site in the dry mix form in an amount from about 2 to about 6 pounds per cubic yard of contaminated soil. The glacial tills may be added to the contaminated soil at different points in the remediation of the contaminated soil to maintain a sufficient concentration of the glacial tills. Furthermore, the glacial tills may be added to the contaminated soil in a combination consisting of the bioremediation solutions and the dry mixes.

The glacial tills are further important as they contain soluble forms of cations and anions. The cations from the glacial tills will bind organic forms of sulfur, thus preventing a high level of organic sulfur within the contaminated soil. Preventing the deposit of organic sulfur in the contaminated soil is important as too much organic sulfur in the soil will make the remediation unacceptable. The addition of too much organic sulfur will cause the replacement of one contaminant with another contaminant. Furthermore, without the addition of the glacial tills to the bioremediation compositions the degradation time of the halogenated contaminants is greatly increased. Thus, the glacial tills enhance the speed with which the halogenated contaminants are degraded and prevent the deposit of organic sulfur in the soil.

The iron derivatives of the bioremediation compositions are used by the indigenous bacteria to enhance the degradation of the contaminants and as a result, are a necessary part of the bioremediation compositions. The amount of the iron derivatives used in the bioremediation compositions will vary with the prevailing conditions of the contaminated site to be remediated. Differing environmental factors at each contaminated site determine the amount of the iron derivatives to be added to the bioremediation compositions. However, the iron derivatives must be added in sufficient quantity to the bioremediation compositions to achieve a concentration at the contaminated site of from about 30 to about 100 parts per million by weight. If the level of the iron derivatives decreases as the contaminated site is remediated, further amounts of the iron derivatives may be added to raise the concentration level of the iron derivatives in the contaminated soil. The iron derivatives may be added to the contaminated soil through the bioremediation solutions, the dry mixes or a combination thereof. The following list is illustrative of, but not limited to, the iron derivatives that may be used in the bioremediation compositions. Included are: ferric citrate, electrolytic iron, iron chelate (ethylenediaminetetraacetic acid), ferrous sulfate and mixtures thereof, as well as elemental iron. It should be noted that the above are merely illustrative of the iron derivatives which can be used in the formulation of the bioremediation compositions and should not be limited to those listed. Any iron derivative may be used as long as it promotes bacterial activity and is compatible with the other bioremediation constituents.

A mixture of the iron derivatives may be used whereby the iron derivatives are combined in one of the solutions or the dry mixes, as follows: from about 30 to about 70 parts by weight of the chelated iron ligands are combined with from about 10 to about 30 parts by weight of the citrated iron and added thereto is from about 3 to about 17 parts by weight of the electrolytic iron and from about 10 to about 30 parts by weight of the ferrous sulfate. The mixture of the iron derivatives will be admixed and applied to the contaminated site in an amount sufficient to achieve the desired concentration of the iron derivatives in the contaminated soil, as discussed herein.

The sulfate salts are generally included in the formulation of the bioremediation compositions and can be any derivative salt of a sulfuric acid. The amount of the sulfate salts dissolved in solution or added to the dry mixes may vary. However, enough of the sulfate salts must be used to allow effective remediation of the contaminated site. The sulfate salts may be added to the bioremediation compositions in a sufficient amount to achieve a concentration of the sulfate salts in the contaminated soil of from about 75 to about 250 parts per million by weight. Illustrative of the sulfate salts which may be used are the following: ammonium sulfate, ferrous sulfate, magnesium sulfate, calcium sulfate and mixtures thereof. It should be noted that the above are merely illustrative of the sulfate salts which may be used in the formulation of the bioremediation compositions and the sulfate salts which may be used are not to be limited by the illustrative list. If the concentration of the sulfate salts decreases as the contaminated site is remediated, further amounts of the sulfate salts may be added to raise the concentration level of the sulfate salts in the contaminated soil. Any sulfate salt may be used as long as it is compatible with the other constituents of the bioremediation compositions and the indigenous bacteria. Furthermore, the chosen sulfate salt must be able to function as an electron acceptor in the metabolic processes of the indigenous bacteria. The sulfate salts serve as an electron acceptor which is crucial to the speed with which the halogenated contaminants are degraded.

The sulfate salts may be used individually or in combination to achieve the desired concentration at the contaminated site. In a preferred embodiment, the sulfate salts will be combined as follows: from about 20 to about 60 parts by weight of the magnesium sulfate will be combined with from about 15 to about 45 parts by weight of the calcium sulfate additionally, from about 3 to about 17 parts by weight of the ammonium sulfate will be added with from about 10 to about 30 parts by weight of the ferrous sulfate.

The electron donors will be added to the bioremediation compositions in an amount sufficient to achieve a concentration in the contaminated soil of from about 50 to about 75 parts per million, by weight. The preferred electron donor used is typically sodium benzoate. However, other electron donors may be used as long as they are compatible with the other constituents and allow the indigenous bacteria to properly degrade the contaminants. If the concentration of the electron donors decreases as the contaminated site is remediated then further amounts of the electron donors may be added to raise the concentration level of the electron donors in the contaminated soil. Like the other constituents, the electron donors may be added to the contaminated site through the bioremediation solutions, the dry mixes or a combination thereof.

The yeast extracts will primarily consist of, but not be limited by, the following constituents: niacin, thiamine B 1, riboflavin B2, pyroxidine BC, vitamin B 12, pantothenic acid, biotin, choline, inositol, folic acid, para-amino benzoic acid, hydroxyproline, alanine, arginine, aspartic acid, cystine, glutamic acid, glycine, histidine, isoleucine, leucine, lysine, methionine, proline, threonine, tyrosine, phenylalaine, serine, tryptophon and valine. A preferred yeast extract is marketed under the name Red Star Nutritional Yeast Products sold by Universal Food Corporation, of Milwaukee, Wis., which is commercially available and contains a wide variety of amino acids and vitamins necessary for the increased growth and metabolism of the indigenous bacteria located in the contaminated soil. The yeast extracts are generally added to the bioremediation compositions in an amount equal to from about 1 to about 5 grams per liter of solution. The yeast extracts are typically dissolved in the bioremediation solutions prior to application to the contaminated soil. However, the yeast extracts may be also added to the contaminated soil through the bioremediation dry mixes. While the Red Star Yeast Extract is preferred, any yeast extract may be used as long as it adequately promotes population growth and metabolism in the indigenous bacteria. The yeast extracts in combination with the glacial till are necessary to provide sufficient nutrients, vitamins, amino acids and elemental compounds to the indigenous bacteria to allow the indigenous bacteria to properly expand their populations and to adequately metabolize the halogenated contaminants.

The phosphorous compounds used in the bioremediation compositions may be added to the bioremediation solutions in a soluble form chosen preferably from either ortho phosphate or mono ammonium phosphate. However, other phosphorous compounds may be used as long as they are compatible with the indigenous bacteria and the other constituents. Also, the phosphorous compounds should preferably dissolve completely in solution. The phosphorus compounds may also be added to the contaminated soil in a dry mix form that is designed for slow release. The dry mix phosphorus compounds can be chosen from a variety of phosphorus compounds. The preferred dry mix phosphorus compound is mono ammonium phosphate. The phosphorous compounds are generally added to the soil in a ratio amount equal to 100 parts by weight of indigenous carbon to 1 part by weight of the phosphorous compounds. Thus, if the contaminated soil contains 100 grams of carbon then 1 gram of the phosphorous compounds will be added to the contaminated soil. The phosphorus compounds may be delivered to the contaminated soil in solution, dry mix or a combination thereof.

The nitrogen compounds used in the bioremediation compositions are preferably added to the bioremediation solutions in a soluble form which allows the nitrogen compounds to blend easily into the bioremediation solutions. Generally, ammonia/urea nitrogen will be added to the bioremediation solutions. However, other forms of the nitrogen compounds may be added to the bioremediation solutions. The preferred dry mix nitrogen compound is urea nitrogen. However, other nitrogen compounds may also be used. The nitrogen compounds are generally added to the bioremediation compositions in an amount sufficient to equal a ratio of either 100 parts by weight of indigenous carbon to about 5 parts by weight of the nitrogen compounds, or 100 parts by weight of the indigenous carbon to about 20 parts by weight of the nitrogen compounds. The optimum ratio of the nitrogen compounds will be an amount sufficient to equal a ratio of 100 parts by weight of indigenous carbon to about 10 parts by weight of the nitrogen compounds.

The bioremediation compositions stimulate a variety of micro-organisms to degrade the halogenated contaminants. Among the potential organisms that may degrade the halogenated contaminants are yeast, bacteria, virus and molds. Generally, the preferred micro-organism used in association with the bioremediation compositions will be the indigenous bacteria located at the contaminated site. The indigenous or wild type bacteria activated by the bioremediation compositions may be facultative bacteria, anaerobic bacteria and/or aerobic bacteria. The preferred indigenous bacteria is from the genus Acinetobacter and the preferred strain is *Acinetobacter johnsonii*. Another preferred indigenous bacteria is from the genus Serratia and the preferred strain is *Serratia marcescens*.

In a preferred embodiment, compost is added to the contaminated soil at the remediation site after the bioremediation compositions have been applied to the contaminated site. The addition of the compost changes the permeability of the soil causing water to be more readily retained in the soil. The compost is generally added to the contaminated site in an amount sufficient to equal between about 10 to about 15 % of the total cubic yards of the soil at the contaminated site. The compost additionally holds the constituents of the bioremediation compositions causing the constituents to be concentrated in an area. By having the constituents concentrated in one area, the indigenous bacteria can more easily receive nutrients necessary to their growth. Ideally, the moisture content in the contaminated soil will be a saturation level between about 20 to 30% moisture by weight in the soil. As will be discussed later, maintaining a sufficient moisture level in the contaminated soil will help to maintain optimum growth and activity in the indigenous bacteria. The compost also adds to the microbial diversity of the contaminated site.

Surfactants are another preferred embodiment to be added to the bioremediation compositions. The surfactants increase the solubility of the various bioremediation constituents allowing the indigenous bacteria to have an increased uptake of the various constituents, thus increasing metabolism. As a result of an increased metabolism the bacteria will process the contaminants quicker causing faster degradation of the contaminants. The surfactants are important because they readily solubilize the bioremediation constituents making it easier for the bacteria to take up the bioremediation constituents. Both anionic and ionic surfactants may be used as long as they are capable of readily solubilizing the bioremediation constituents so as to promote the increased uptake of the various nutrients by the indigenous bacteria. The preferred surfactants is 2-butoxyethanol. However, any suitable surfactant may be used as long as it is compatible with the bioremediation constituents and the indigenous bacteria. Any amount of the surfactants may be added to the bioremediation compositions as long as the bioremediation constituents are sufficiently solubilized to allow increased uptake by the indigenous bacteria. However, the amount of the surfactants typically added to any of the bioremediation compositions will be an amount of from about 1 to about 5 parts by volume of solution. The amount of the surfactants added to the bioremediation compositions can be dependent upon the soil type being remediated as the soil type may affect the solubility of the bioremediation constituents.

In another preferred embodiment a muriate of potash is added to the bioremediation compositions. The muriate of potash will increase the conductivity of the soil. The amount of the potash added will be from about 1 to about 3 parts by volume of solution.

For the bioremediation compositions to most successfully remediate the halogen contaminated soil, water is preferred in the present invention. The indigenous bacteria will most successfully remediate the contaminants when an effective saturation point is maintained. It is preferred to add enough water to the contaminated site to reach a soil water holding capacity of 50 to 80% of water capacity in the soil. More importantly, the holding capacity will reach a moisture saturation point of 20 to 30% of moisture by weight within the contaminated soil. Thus for the present invention to work most efficiently, the contaminated soil should have a moisture content between about 20 to 30% by weight or 50 to 80% of the moisture holding capacity of the soil. The saturated soil is necessary to properly promote the growth and metabolism of the indigenous bacteria located within the soil of the contaminated site. Without proper saturation of the contaminated soil, the bioremediation compositions will be less effective in the remediation of the contaminated soil. Thus, for the bioremediation compositions to activate the indigenous bacteria to degrade the halogenated contaminants, a saturation point of between about 20 to 30% moisture by weight should be maintained in order to achieve optimum remediation of the halogenated contaminants within the soil.

METHOD OF APPLICATION OF THE BIOREMEDIATION COMPOSITION

The method of application of the bioremediation compositions to the contaminated soil comprises forming the bioremediation compositions in solution or forming the bioremediation compositions in dry mix. The bioremediation compositions consist essentially of sufficient amounts the iron derivatives, the sulfate salts, the glacial till, the yeast extracts, the electron donors, the nitrogen compounds and the phosphorus compounds. The bioremediation compositions in solution will preferably combine the bioremediation constituents with distilled water, however, other types of water may be used. Furthermore, the bioremediation compositions may additionally contain a desired amount of the surfactants and the muriate of potash.

The bioremediation compositions in solution are added to the contaminated soil by spraying the solutions onto the contaminated soil and then mixing the bioremediation compositions in solution in with the contaminated soil by using any piece of equipment capable of mixing the soil and the solutions. Preferably, a backhoe is used to mix the soil and the bioremediation solutions into a muddy "soup" like consistency. The bioremediation compositions in solution are used regardless of whether the contaminants are located near the surface or far below the surface of the soil. Typically, the bioremediation compositions in solution are added to the soil in a sufficient amount to achieve a saturation level from about 20% to 30% moisture by weight in the contaminated soil as well as a sufficient concentration of the bioremediation constituents. Additionally, a desirable amount of compost may be added to the solution and soil mixture. The compost may be of any of a variety of different composts as long the permeability of the soil is increased causing the moisture to be more readily retained in the soil. The compost is further beneficial as it increases the microbial diversity within the soil. Also, the bioremediation solution is beneficial as it will induce indigenous bacteria to begin immediate remediation.

In addition to the bioremediation compositions in solution, a desirable amount of the bioremediation dry mixes may be also added to the contaminated site. The bioremediation dry mixes may contain the same constituents as the bioremediation compositions in solution or only some of the constituents of the bioremediation compositions in solution. The bioremediation dry mixes serve to slowly release the bioremediation constituents into the soil and to increase the concentration of the constituents in the soil. In effect the bioremediation dry mixes are a time release mechanism used to ensure a constant supply of the bioremediation constituents to the indigenous bacteria. The bioremediation dry mixes may be added to the contaminated site and mixed in with the backhoe or other surface mixing equipment. It is preferred to apply the bioremediation dry mixes to near surface contaminated sites. However, the dry mixes may be applied to deep level contaminated sites. Also, the bioremediation dry mixes may be added in tandem with the bioremediation solutions or may be added separately. It is preferred to add the bioremediation dry mixes in tandem with the bioremediation solutions to ensure an immediate supply of bioremediation constituents and a sustained supply of bioremediation constituents.

After the addition of the bioremediation compositions to the contaminated soil, measurements of the concentration of the constituents within the soil may be taken periodically by conventional testing means. If it is found that the individual bioremediation constituents are not present in sufficient quantities, then a further amount of the bioremediation compositions, either dry mix or in solution, containing the necessary constituents may be prepared and added to the contaminated soil so as to increase the bioremediation constituents to acceptable levels. Thus, the solution, the dry mix and the potential addition of more compositions work in tandem to maintain a desired concentration of the bioremediation constituents in the soil. It is also important to maintain a sufficient level of moisture saturation in the soil so as to maintain optimum microbial degradation. Thus, it is important to constantly monitor the contaminated site to ensure that optimum bioremediation is occurring. Typically, the contaminated site will require two months to a year to be remediated to acceptable state environmental promulgated standards. The use of the bioremediation compositions will result in the remediation of both the contaminated soil and the contaminated ground water.

APPLICATION OF THE BIOREMEDIATION COMPOSITION TO A DEEP SURFACE CONTAMINATED AREA

If the contaminates are located at a level below the surface where the backhoe or other surface equipment are unable to reach, then a secondary method is used whereby the bioremediation compositions in solution are injected under pressure into the sub-surface environment. The bioremediation compositions in solution will contain essentially the same constituents as the other previously mentioned bioremediation compositions in solution. Included in the bioremediation compositions in solution to be injected into the sub-surface environment will be the iron derivatives, the sulfate salts, the electron donors, the yeast extracts, the glacial tills, the nitrogen compounds and the phosphorus compounds. Other constituents may be added to the bioremediation solution to be applied to the deep level site. The pressurized injection method may be accomplished by using a rotary boring homogenizing piece of equipment or any other piece of equipment that will sufficiently deliver the bioremediation compositions to the sub-surface environment. The bioremediation dry mixes may be used although, the bioremediation solutions are the preferred compositions. While the method of delivery of the bioremediation compositions in solution to the deep level contaminated sites is somewhat different from the method used to deliver the bioremediation compositions to the surface contaminated sites, the results are substantially the same. The same basic constituents are delivered to the contaminated areas so as to allow the indigenous micro-organisms to degrade the contaminants. Thus, bioremediation may be facilitated regardless of whether the contaminants are located near the surface of the earth or far below the surface of the earth.

ISOLATION OF THE BACTERIA

An analysis of soil samples taken from a contaminated site was performed to isolate the bacteria strains responsible for the degradation of the halogenated contaminants. The isolation was begun by extracting 8 soil samples from a contaminated site. It was theorized that the indigenous bacteria responsible for the degradation of the halogenated contaminants would be present in a sufficient quantity to isolate. After removal from the contaminated site, the initial isolates were diluted and then transferred to a dried trypticase soy agar (TSA) medium housed in a set of standard petri plates. An oxyrase agar also housed in standard petri plates was used for growing potential anaerobes. Colony forming units (CFU) were isolated from the petri plates after 48 hours of incubation at 28° C. The isolated colonies were then individually streaked onto TSA plates and were grown for a further 24 hour incubation period to increase the population to a sufficient point so that test could be conducted to identify the individual strains of bacteria. The bacteria identification tests used were GC-FAME and Biolog™ methodologies. After identification, the individual bacteria strains were further grown overnight (18 hours) in TSA broth agar at 28° C. and then pipetted into a group of 96 well microtiter plates in which the bacteria strains were combined with growth media and tetrazolium dye. After the bacteria strains were placed in the microtiter wells, contaminants tetrachloroethylene (PERC), trichloroethene (TCE), trichloroethane (TCA), 1,2-dichlorobenzene and 1,3-dichlorobenzene were added to the microtiter wells individually in 10 microliter volumes. The growth of the bacteria after the addition of the contaminants was measured by the chemical reduction of the redox active tetrazolium dye. It was found that the following bacteria utilized the halogenated contaminants: *Acinetobacter johnsonii, Pseudomonas marginalis, Acinetobacter calcoaceticus, Curtobacterium flaccumfaciens, Arthrobacter prolophormiae/ramosus, Pseudomonasfluorescens* type G, *Acinetobacter johnsonii/genospecies* 7, *Bacillus insolitus, Bacillus amyloliquefaciens, Bacillus mycoides* GC subgroup A, *Bacillus azotoformans, Bacillus thuringiensis, Serratia marcescens, Enterobacter agglomerans* and *Bacillus circulans*. It was further found that of the bacteria strains isolated the *Acinetobacter johnsonii* was the indigenous bacteria that most readily used the halogenated contaminants as a carbon source. Specifically, the bacteria strain *Acinetobacter johnsonii* readily used the contaminants TCE, PERC and 1,2-dichlorobenzene as a carbon source. It can be inferred from the isolation experiments, that the bacteria that thrived in the contaminants and used the contaminants as part of the metabolic process. Thus, the population expanded as the process of growth was aided by the contaminants. Generally, innate compounds such as ethane and/or ethene were rendered as final by-products of metabolism. The indigenous bacteria activated by the bioremediation compositions may be facultative bacteria, anaerobic bacteria and/or aerobic bacteria and more specifically, aerobic Acinetobacter and Serratia bacteria. The Acinetobacter and Serratia genus of bacteria are identified as the preferred bacteria with the strain *Acinetobacter johnsonii* and *Serratia marcescens* as the most preferred halogenated contaminant degrading bacteria. While it is acknowledged that bacteria are the most effective micro-organisms in degrading halogenated contaminants, it is believed that other micro-organisms may be activated to degrade the halogenated contaminants.

EXAMPLES

Example 1

A mixture was prepared by combining the following ingredients to form an intimate blend:

| | |
|---|---|
| 100 mg/L of water | magnesium sulfate, |
| 300 mg/L of water | iron sulfate, |
| 100 mg/L of water | sodium benzoate, |
| 50 mg/L of water | calcium sulfate |
| 3000 mg/L of water | Red Star commercial yeast extract sold by Universal Foods Corporation, |
| 3000 mg/L of water | BIO-2 Biological Activator glacial till sold by Meridian Corp., | ammonium phosphate was added in a sufficient amount to achieve a concentration of 300 parts per million (ppm) in the contaminated soil and urea was added in amount sufficient to achieve a concentration of 100 ppm in the contaminated soil. The ingredients were mixed with one liter of distilled water. The ingredients were thoroughly mixed and then added to contaminated brown clay taken from a contaminated site having a moisture content of approximately 16%. Once the constituents were dissolved in solution and added to the contaminated soil, the moisture content of the soil was raised to 25% saturation. The contaminants were monitored for degradation. The contaminants included the following: tetrachloroethylene (PERC), 1,2-dichlorobenzene, 1,3-dichlorobenzene, trichloroethane (TCA), and trichloroethene (TCE). The concentrations of the halogenated contaminants were monitored to determine whether they were degraded by the indigenous bacteria. The bioremediation constituents and soil were sealed in a container to create an anaerobic environment at an average temperature of 62° F. The sealed container used was a Pyrex container having a 300 ml. capacity. Samples of the halogenated contaminants were then taken at approximately one (1) month intervals for a period of five (5) months. The initial concentration of organic contaminants was as follows: 1,2-dichloroethane at 0.289 ppm, dichloromethane at 0.061 ppm, trans-1,2-dichloroethene at 1.105 ppm, 1,1-dichloroethane at 5.761 ppm, cis-1,2-dichloroethene at 7.457 ppm, 1,1,1-trichloroethane at 24.512 ppm, trichloroethene at 0.255 ppm and 1,1,2-trichloroethane at 1.087 ppm.

The final resulting concentrations of the contaminants were as follows 1,2-dichloroethane was not detectable in significant quantities, dichloromethane was not detectable in significant quantities, trans-1,2-dichloroethene at 0.014 ppm, 1,1-dichloroethane at 0.581 ppm, cis-1,2-dichloroethene at 0.070 ppm, 1,1,1-trichloroethane at 0.036 ppm, trichloroethene at 0.014 ppm and 1,1,2-trichloroethane was not detectable is significant quantities.

As can be seen from the data presented, there was a significant reduction in the contaminants in the soil created by the admixing of the constituents to the contaminated soil containing the indigenous bacteria. Furthermore, the degradation resulted in levels acceptable to site specific state promulgated standards. It should also be noted that vinyl chloride was undetected. When comparing the level of the contaminants between the initial mixture and the final mixture, there was a significant reduction in the halogenated compounds in the soil. In some cases the contaminants were virtually eliminated from the soil.

Example 2

A bioremediation composition was prepared using the same constituents and procedures as in Example 1. Sodium benzoate, the electron donor, was excluded from the mix. It is to be noted that there was some variation with regards to the initial level of contaminants in the soil sample. The variation is attributable to natural variations occurring in the soil. The contaminant's initial and final concentrations were as follows: 1,2-dichloroethane started with an initial concentration of 0.287 ppm and was reduced to an amount not detectable in significant quantities, dichloromethane started at 0.053 ppm and was reduced to an amount not detectable in significant quantities, trans-1,2-dichloroethene started at 1.907 ppm and was reduced to an amount not detectable in significant quantities, 1,1-dichloroethane had an initial concentration of 5.27 ppm and a final concentration of 0.172 ppm, cis-1,2-dichloroethene having initial concentration of 6.516 ppm and was reduced to an amount not detectable in significant quantities, 1,1,1-trichloroethane had an initial concentration of 23.217 ppm and a final concentration of 0.163 ppm, trichloroethene had an initial concentration of 0.246 ppm and was reduced to an amount not detectable in significant quantities and finally 1,1,2-trichloroethane had an initial concentration of 0.073 ppm and was reduced to an amount not detectable in significant quantities.

As can be seen from the final concentration of the contaminants within the soil samples, the indigenous bacteria did not as effectively degrade the 1,1,1-trichloroethane as the composition of Example 1. Thus, it was demonstrated that the electron donor is crucial to the speed and thoroughness with which the indigenous bacteria will degrade the halogenated contaminants.

Example 3

A bioremediation composition was prepared using the same constituents and procedures as set forth in Example 1. However, in the present example, calcium sulfate was excluded from the mixture. Once again, favorable results pertaining to the degradation of chlorinated compounds resulted as the mixture proved somewhat effective in reducing chlorinated compounds from the soil. The concentrations were as follows: 1,2-dichloroethane started at a concentration of 0.081 ppm and ended with an amount not detectable in significant quantities, dichloromethane started with a concentration of 0.023 ppm and ended with not detectable in significant quantities, trans-1,2-dichloroethene had an initial concentration of 0.389 ppm and a resulting concentration of 0.049 ppm, 1,1-dichloroethane had an initial concentration of 1.887 ppm and a final concentration of 1.072 ppm, cis-1,2-dichloroethene had an initial concentration of 2.664 ppm and a final concentration of 0.275 ppm, trichloroethene had an initial concentration of 0.083 ppm and ended with an amount not detectable is significant quantities and 1,1,2-trichloroethane had an initial concentration of 0.03 ppm and a final concentration that was not detectable in significant quantities.

Upon examination of the data from Example 3, it can be shown that effective degradation of halogenated contaminants occurred. However, the contaminants were not as significantly degraded as in Example 1. The lesser degradation can be attributed to a lesser amount of the sulfate salt used in the present bioremediation composition. Thus, this example demonstrates the necessity of a sufficient amount of sulfate salt to degrade halogenated contaminants.

Example 4

A bioremediation composition was prepared using the same constituents and procedures as set forth in Example 1. However, in the present example, iron sulfate and calcium sulfate were excluded from the mixture. The results of the present experiment were as follows: 1,2-dichloroethane had initial concentration of 0.151 ppm and a final concentration in an amount not detectable in significant quantities, dichloromethane had an initial concentration of 0.041 ppm and a final concentration not detectable in significant quantities, trans-1,2-dichloroethene had an initial concentration of 0.645 ppm and a final concentration not detectable in significant quantities, 1,1-dichloroethane had an initial concentration of 3.39 ppm and a final concentration of 0.027 ppm, cis-1,2-dichloroethene had an initial concentration of 4.522 ppm and a final concentration not detectable in significant quantities, 1,1,1-trichloroethane had an initial concentration of 12.285 ppm and a final concentration of 0.043 ppm, trichloroethene had an initial concentration of 0.150 ppm and a final concentration not detectable in significant quantities and 1,1,2-trichloroethane had an initial concentration of 0.053 ppm and a final concentration which was in an amount undetected in significant quantities.

The examination of the data from Example 4 points out the importance of sulfate salts to the success of the bioremediation composition. As can be seen from the data of Example 4, the halogenated contaminants were degraded. However, 1,1,1-trichloroethane was not degraded to the same level as the composition used in example 1. Once again, this shows that in order for the bioremediation compositions to effectively remediate the halogen contaminated soils sulfate salts must be included in the bioremediation compositions in sufficient quantities.

Example 5

A bioremediation composition was prepared using the same constituents and procedures as set forth in Example 1. However, the present example only included yeast extract, glacial till, a nitrogen compound and a phosphorous compounds. The results of the experiment were as follows: 1,2-dichloroethane had an initial concentration of 0.120 ppm and a resulting concentration not detectable in significant quantities, dichloromethane had an initial concentration of 0.030 ppm and a final concentration not detectable in significant quantities, trans-1,2-dichloroethene had an initial concentration of 0.456 ppm and a final concentration of 0.162 ppm, 1, 1 -dichloroethane had an initial concentration of 2.372 ppm and a final concentration of 1.541 ppm, cis-1,2-dichloroethene had an initial concentration of 2.981 ppm and a final concentration of 1.293 ppm, 1,1,1-trichloroethane had an initial concentration of 12.209 ppm and a final concentration of 6.450 ppm, trichloroethene had an initial concentration of 0.107 ppm and a final concentration of 0.171 ppm and 1,1,2-trichloroethane had an initial concentration of 0.034 ppm and a final concentration in an amount not detectable in significant quantities.

As can be seen from the data, the exclusion of sulfate salts and other essential components from the bioremediation composition resulted in either very little degradation of the halogenated contaminants or no degradation of the halogenated contaminants. This experiment further demonstrated that nutrients, vitamins and amino acids alone are not sufficient to stimulate the indigenous bacteria to degrade the halogenated contaminants.

Example 6

A bioremediation composition was prepared by combining with a desirable amount of distilled water in solution 100 milligrams of magnesium sulfate, 300 milligrams of iron sulfate, 100 milligrams of sodium benzoate, 3000 milligrams of yeast extract, 3000 milligrams of diatomaceous earth, 100 milligrams of nitrogen to equal a concentration of approximately 300 ppm in the contaminated soil, and 100 milligrams of urea to equal a concentration of approximately 100 ppm of urea in the contaminated soil. The constituents were thoroughly admixed to form a uniform solution. A separate glass container housed approximately 1000 grams of contaminated brown clay. The primary, but not the only, contaminants found in the brown clay were the following halogenated contaminants, trichloroethene (TCE), trichloroethane (TCA) and tetrachloroethylene (PERC). The solution was added to the contaminated clay, raising the moisture content of the soil to 25% saturation. After the solution was added to the soil, the container was sealed and the solution soil mixture was kept at a constant temperature of 62 degrees F. or 16.5 degrees C. The initial bacteria count in the contaminated soil was $3 \times 10^5$ bacteria.

Samples of the contaminated soil were taken with the data showing a 99 percent reduction of TCA, from 24 ppm to 0.04 ppm. The TCE showed a reduction from 0.26 ppm to 0.014 ppm or a 95% reduction.

As can be seen from the data presented from this experiment, there was a significant reduction of the contaminants in the clay. The samples were frequently analyzed and four months after the initial bioremediation solution was added to the contaminated soil, sufficient remediation to comply with promulgated standards had occurred. When comparing the level of contamination between the initial mixture and the final mixture, there was a significant reduction in the halogenated contaminants in the soil.

Example 7

Eight soil samples were taken from a bioremediation site contaminated with halogenated aliphatic and aromatic contaminants. The samples were then diluted and the dilutions were aeseptically transferred in a laminar flow biological cabinet and streaked onto a previously prepared dried trypticase soy agar (TSA) medium in petri plates. The dilutions were also plated on oxyrase agar for growing anaerobes. The plates were then incubated for 48 hours at 28 degrees C. The individual bacteria strains grew into colony forming units (CFU) and the CFU strains were then streaked onto TSA plates to increase the individual CFU populations. The colonies from the TSA plates were then processed after 24 hours using GC-FAME and Biolog™ methodologies. The tests identified the bacteria strains by using a species database that has an "average" set of characteristics for each species. The tests revealed statistical probabilities for the identification of certain species. The strains were prepared for GC-FAME and ™Biolog analysis by suspending the bacteria strains in sterile saline solution and pipetting the solutions containing bacteria into wells on microtiter plates for examination. Sixteen aerobic and anaerobic bacteria strains were isolated and identified including 13 aerobic and three anaerobic strains.

After identification, the bacteria strains were then analyzed for their degradative potential. The 16 strains were grown overnight, 18 hours in trypticase soy broth agar at 28° C. and then re-suspended in sterile water to a turbidity level of 40% –50% T. Following suspension, the strains were loaded into 96 well microtiter plates with the TSA and one of the contaminants. The contaminants were varied with each microtiter plate. The bacteria growth was monitored by using a tetrazolium dye based redox indicator system in which the microtiter wells contained tetrazolium dye in addition to the bacteria and nutritional constituents. The bacteria growth in the contaminant hydrocarbon was monitored by the tetrazolium dye reduction and consequent increase in Optical Density Units at 590 nm wavelength light measurements as compared to that produced by the strain in water. Strains were considered positive for growth when the change in optical density of the strain grown in the presence of the contaminant hydrocarbon as its sole carbon source was +0.2 Optical Density Units at 590 nm greater than with the strain and water combination mentioned above. The contaminants tetrachloroethylene, trichloroethene, trichloroethane, 1,2-dichloroethene, and 1,3-dichlorobenzene were added in a 10 microliter volume to all the bacteria strains. Trypticase soy broth served as a positive growth control and nutritional constituent. The plates were incubated in an anaerobic atmosphere using BBL gas packed pouches. Total growth was measured and after 24 hours of incubation at 28° C. the data was processed. The wells in the microtiter plates contained TSA, water and bacteria or TSA, water, contaminants and bacteria.

The results showed that Acinetobacter demonstrated the ability to utilize PERC, TCE, 1,2-dichlorobenzene and 1, 3-dichlorobenzene as carbon sources. The results were interpreted from the microtiter plates where if the strain/contaminant mixture showed greater positive growth than the strain/water mixture, then the bacteria strain's ability to metabolize and degrade the contaminants was demonstrated. Other bacteria strains that showed the ability to metabolize one of the halogenated aliphatic and/or aromatic contaminants were *Acinetobacter johnsonii, Pseudomonas marginalis, Acinetobacter calcoaceticus, Curtobacterium flaccumfaciens, Arthrobacter protophormiae/ramosus, Pseudomonasfluorescens* type G, *Acinetobacter johnsonii/ genospecies 7, Bacillus insolitus, Bacillus amyloliquefaciens, Bacillus mycoides* GC subgroup A,*Bacillus azotoformans, Bacillus thuringiensis, Serratia marcescens, Enterobacter agglomerans,* and *Bacillus circulans*. All of these bacteria are indigenous wild-type strains located at the site of contamination.

Example 8

A bioremediation composition was prepared by intimately blending the following constituents: In a tank containing 1000 gallons of distilled water, the following constituents were added:

| | |
|---|---|
| 40 pounds | ferrous sulfate; |
| 55 pounds | calcium sulfate; |
| 75 pounds | magnesium sulfate; |
| 15 pounds | ammonium sulfate; |
| 25 pounds | sodium benzoate; |
| 160 pounds | Bio-2 glacial till; |
| (1) 25 pound bag of Nutriculture Plus Bermuda Special 25-5-20 Plus, where 25 is nitrogen, 5 is phosphorus, and 20 is potash, the 25 pound bag containing: | |
| 25% N(nitrogen) 6.25 lbs. | |
| 2.95% ammoniacal nitrogen | |
| 6.10% nitrate nitrogen | |
| 15.95% urea nitrogen | |
| resulting in a concentration of: | |
| 737 ppm by volume of in solution comprised of: | |
| 86.97 ppm by volume of ammonical nitrogen; | |
| 179.82 ppm by volume of nitrate | |
| 470.2 ppm by volume of urea nitrogen | |
| 147 ppm by volume of phosphorus | |
| 100 pounds | Red Star yeast; |
| 15 gallons | surfactant; |
| 25 pounds | chelated iron; |
| 15 pounds | citrated iron; and |
| 10 pounds | electrolytic iron. |

The mixture was thoroughly dissolved and then applied to the contaminated site through a spray nozzle. The area remediated by the bioremediation composition was approximately 1100 cubic yards. The area being 80 feet long by 25 feet wide and 15 feet deep. The percentage of moisture within the soil was 15% moisture content by weight and upon the addition of the bioremediation composition the saturation level was 26% by weight. In addition to the bioremediation composition, 100 cubic yards of compost was added to the contaminated area to be remediated. Both the bioremediation composition and the compost were mixed into the contaminated site by using a backhoe. The soil temperature was approximately 55° F. After the thorough mixing of the bioremediation constituents and the compost in the contaminated soil, three soil samples were taken to determine the initial concentration of contaminants present in the soil. The two contaminants tested for were 1,1 -dichloroethane and 1,1,1 -trichloroethane.

The lab samples were maintained at a consistent moisture level of approximately 25% and at a temperature of 60° F. Monitoring was continued, at the site and in the lab samples, to determine if the contaminants were degraded.

| | DICHLOROETHANE | | TRICHLOROETHANE | |
|---|---|---|---|---|
| | LAB | FIELD | LAB | FIELD |
| 08/30/94 | 2.251 | .265 | 13.156 | 14.290 |
| 10/18/94 | 1.660 | — | 1.449 | — |
| 10/28/94 | 2.595 | — | .417 | — |
| 11/04/94 | 1.580 | — | .200 | — |
| 11/30/94 | .432 | — | .072 | — |
| 01/09/95 | .384 | 0.553 | .076 | .991 |

The field moisture content after the addition of the bioremediation compositions was 27% and the final moisture content after remediation had occurred was 19%. The field samples, both the initial and the final measurements, were an average of three samples taken from the test site.

As can be seen from the field data and lab tests, the bioremediation composition promoted activity in the indigenous bacteria to significantly degrade trichloroethane. However, more importantly, the dichloroethene results show that it is important to maintain a sufficient moisture saturation level in the contaminated soil. If the moisture saturation level is not maintained, the bioremediation composition will not be effective. The effect of proper moisture saturation was demonstrated by the test data which showed that dichloroethane degradation occurred in the lab where moisture levels were maintained but not in the field where moisture levels were allowed to decrease below acceptable levels.

Example 9

A control test was conducted to develop a comparative test to Example 1. In the control test, nothing was added to the contaminated soil. Samples were taken to see if the contaminants were naturally degraded or volatized into the environment. The results of the control test were as follows:

1,2-dichloroethane had an initial concentration of 0.044 ppm and a final concentration in an amount not detectable in significant quantities, dichloromethane had an initial concentration of 0.014 ppm and a final concentration not detectable in significant quantities, trans-1, 2-dichloroethene had an initial concentration of 1.267 ppm and a final concentration of 0.197 ppm, 1,1-dichloroethane had an initial concentration of 0.948 ppm and a final concentration of 1.141 ppm, cis-1,2-dichloroethene had an initial concentration of 0.181 ppm and a final concentration of 1.303 ppm, 1,1,1 -trichloroethane had an initial concentration of 4.158 ppm and a final concentration of 8.796 ppm, trichloroethene had an initial concentration of 0.044 ppm and a final concentration of 0.089 ppm and 1,1,2-trichloroethane had an initial concentration of 0.016 ppm and a final concentration not detectable in significant quantities.

The discrepancies between the initial measurement and the final measurement in the control sample can be attributed to the dense tight clay in which the contaminants were contained. As a result of the tight clay, the contaminants were not mixed into a homogenous blend. However, from the data, it can be shown that the contaminants either were not degraded, or if they did show some degradation, it was minor. The importance of this example is that it shows the ability of the present invention to degrade halogenated aromatic and aliphatic contaminants. Also, because of the very tight clay, the contaminants were not volatized into the atmosphere.

Example 10

A bioremediation composition was prepared using the same constituents and procedures as set forth in Example 1. The Example, however, contained *Acinetobacter johnsonii* which was isolated in accordance with the procedures used in Example 7. The bioremediation constituents and the *Acinetobacter johnsonii* bacteria, in combination, showed significant reduction in a one month time period as will be seen in the following table:

| ORGANICS - PPM | 12/20/94 INITIAL CONTAMINANTS | 01/24/95 FINAL CONTAMINANTS |
| --- | --- | --- |
| 1,2-dichloroethane | 2.9 | 1.0 |
| dichloromethane | 6.6 | 5.6 |
| trans-1,2-dichloroethene | — | — |
| 1,1-dichloroethane | 14 | 11.2 |
| cis 1,2-dichloroethene | 353 | 257 |
| 1,1,1-trichloroethane | 289 | 209 |
| trichloroethane | 3.2 | 2.0 |
| tetrachloroethene | 66 | 46 |
| 1,1,2-trichloroethane | — | — |
| 1,2-dichlorobenzene | 496 | 306 |
| 1,3-dichlorobenzene | 12 | 8.4 |

As can be seen from the table, the combination of the *Acientobacter johnsonii* with the bioremediation composition effectively degraded the contaminants immediately. Specifically, the PERC, or 1,1,1 -trichloroethane showed significant degradation in a shortened time period which is not typical for an aerobic strain of bacteria.

While it is acknowledged that bacteria are the most effective micro-organisms in degrading halogenated contaminants, it is believed that other micro-organisms, such as fungi and yeast, may be activated to degrade the halogenated contaminants.

While it is acknowledged that generally the surfactants are added to the bioremediation compositions, the indigenous micro-organisms may produce a biosurfactant capable of enhancing the solubility of the organic material.

Thus there has been shown and described a novel method for preparing bioremediation compositions containing sulfate salts, iron derivatives, electron donors, yeast extract, glacial till, nitrogen compounds and phosphorus compounds which fulfills all of the objects and advantages sought therefor. It will be apparent to those skilled in the art, however, that many changes, variations, modifications and other uses and applications for the subject method are possible, and also such changes, variations, modifications, and other uses and applications which do not depart from the spirit and scope of the invention are deemed to be covered by the invention which is limited only by the claims which follow.

What is claimed is:

1. A method for in-situ bioremediation of soil contaminated with halogenated aliphatic and halogenated aromatic compounds through stimulation of indigenous bacteria, which remediates the soil in about 8 weeks so as to remediate the halogenated aliphatic and the halogenated aromatic compounds to levels less than 1 part per million by weight in the contaminated soil and which comprises:

analyzing the contaminated soil to determine what constituents and how much of said constituents are located in the contaminated soil prior to bioremediation;

forming a bioremediation composition in solution, with the amount of said constituents added to said bioremediation composition in solution determined by the analysis of the contaminated soil such that said bioremediation composition in solution contains the following said constituents;

a sufficient amount of a sulfate salt to achieve a range of from about 75 to about 250 parts per million by weight in the contaminated soil, with said sulfate salt selected from the group consisting of magnesium sulfate, calcium sulfate, ammonium sulfate, and ferrous sulfate;

a sufficient amount of an iron derivative to achieve a range of from about 30 to about 100 parts per million by weight in the contaminated soil, said iron derivative comprised of a mixture of an amount of chelated iron ligands equal to from about 20 to about 80 parts by weight of said iron derivative, an amount of citrated iron equal to from about 10 to about 30 parts by weight of said iron derivative, an amount of electrolytic iron equal to from about 1 to about 20 parts by weight of said iron derivative, and an amount of ferrous sulfate equal to from about 10 to about 30 parts by weight of said iron derivative;

a sufficient amount of a sodium benzoate to achieve a range of from about 50 to about 75 parts per million by weight in the contaminated soil;

an amount of glacial till equal to from about 1 to about 5 grams per liter of said bioremediation composition in solution with said glacial till selected from the group consisting of diatomaceous earth and siliceous skeletons;

an amount of yeast extract equal to from about 1 to about 5 grams per liter of said bioremediation composition in solution;

a sufficient amount of a nitrogen compound to equal a concentration ratio of about 100 parts by weight of indigenous carbon to from about 5 to about 20 parts by weight of said nitrogen compound in the contaminated soil, with said nitrogen compound selected from the group consisting of ammonium and urea;

a sufficient amount of a phosphorus compound to equal a concentration ratio of about 100 parts by weight of indigenous carbon to about 1 part by weight of said phosphorus compound within the contaminated soil, with said phosphorous compound selected from the group consisting of orthophosphate and mono ammonium phosphate;

an amount of 2-butoxyethanol equal to from about 1 to about 5 parts by volume of said bioremediation composition in solution;

introducing said bioremediation composition in solution to a contaminated site so as to stimulate the indigenous bacteria, to degrade the halogenated aliphatic and the halogenated aromatic compounds in the contaminated soil with enough of said bioremediation composition in solution added to the soil to maintain a moisture saturation level in the contaminated soil at a level equal to between about 20 and about 30 percent total moisture by weight of the contaminated soil with the indigenous bacteria selected from the group consisting of *Acinetobacter johnsonii, Pseudomonas marginalis, Acinetobacter calcoaceticus, Curtobacterium flaccumfaciens, Arthrobacter protophormiae/ramosus, Pseudomonas fluoresces* type G, *Acinetobacter johnsonii/genospecies* 7, *Bacillus insolitus, Bacillus amyloliquefaciens, Bacillus mycoides* GC subgroup A, *Bacillus azotoformans, Bacillus thuringiensis, Serratia marcescens, Enterobacter agglomerans,* and *Bacillus circulans;* and, monitoring the concentration of said constituents in the contaminated soil, with additional amounts of said constituents added to the contaminated soil to maintain the concentrations of said constituent in the contaminated soil.

2. The method of claim 1 wherein the bioremediation solution further contains an amount of potassium chloride equal to from about 0.125 to about 0.5 grams per liter of the bioremediation solution.

3. The method of claim 1 wherein the bioremediation solution further contains an amount of compost equal to from about 10 to about 15 percent per total cubic yards of the contaminated soil to be remediated.

4. The method of claim 1 wherein the bioremediation solution is sprayed onto the contaminated soil.

5. The method of claim 1 wherein the bioremediation solution is pressure injected into the contaminated soil.

6. The method of claim 1 wherein said sulfate salt of said bioremediation composition in solution is a mixture comprised of magnesium sulfate equal to from about 30 to about 50 parts by weight of said sulfate salt, calcium sulfate equal to from about 10 to about 50 parts by weight of said sulfate salt, an ammonium sulfate equal to from about 1 to about 20 parts by weight of said sulfate salt, and ferrous sulfate equal to from about 5 to about 35 parts by weight of said sulfate salt.

7. An in-situ bioremediation solution for promoting degradation of halogenated aliphatic and halogenated aromatic compounds in contaminated soil in about 8 weeks to levels less 1 part per million by weight in the contaminated soil through stimulation of indigenous bacteria, with the indigenous bacteria selected from the group consisting of *Acinetobacter johnsonii, Pseudomonas marginalis, Acinetobacter calcoaceticus, Curtobacterium flaccumfaciens, Arthrobacter protophormiae/ramosus, Pseudomonas fluoresces* type G, *Acinetobacter johnsonii/genospecies* 7, *Bacillus insolitus, Bacillus amyloliquefaciens, Bacillus mycoides* GC subgroup A, *Bacillus azotoformans, Bacillus thuringiensis, Serratia marcescens, Enterobacter agglomerans,* and *Bacillus circulans,* which includes first analyzing the contaminated soil to determine what constituents and how much of said constituents are already located in the contaminated soil, after analyzing the contaminated soil said bioremediation solution is formed, with said solution comprising:

a. a sufficient amount of a sulfate salt to achieve a range of from about 75 to 250 parts per million by weight in the contaminated soil with said sulfate salt selected from the group consisting of magnesium sulfate, calcium sulfate, ammonium sulfate, and ferrous sulfate;

b. a sufficient amount of an iron derivative to achieve a range of from about 30 to about 100 parts per million by weight in the contaminated soil with said iron derivative selected from the group consisting of chelated iron ligands, citrated iron, electrolytic iron, and ferrous sulfate;

c. a sufficient amount of sodium benzoate to achieve a range of from about 50 to about 75 parts per million by weight in the contaminated soil;

d. a yeast extract added in an amount equal to from about 1 to about 5 grams per liter of said solution;

e. glacial till added in an amount equal to from about 1 to about 5 grams per liter of said solution with the glacial till selected from the group consisting of diatomaceous earth and siliceous skeletons;

f. a sufficient amount of a nitrogen compound to equal a concentration ratio in the contaminated soil of about 100 parts by weight of indigenous carbon to from about 5 to about 20 parts by weight of the nitrogen compound, with said nitrogen compound selected from the group consisting of ammonium and urea;

g. a sufficient amount of a phosphorus compound to equal a concentration ratio in the contaminated soil of about 100 parts by weight of indigenous carbon to about 1 part by weight of said phosphorus compound with said phosphorus compound selected from the group consisting of orthophosphate and mono ammonium phosphate;

h. a sufficient amount of water to achieve a moisture saturation level in the contaminated soil ranging between about 20 and that 30 percent total moisture by weight of the contaminated soil; and i. an amount of 2-butoxyethanol equal to from about 1 to about 5 parts by volume of said solution.

8. The bioremediation solution of claim 7 wherein said sulfate salt is a mixture comprised of magnesium sulfate equal to from about 30 to about 50 parts by weight of said sulfate salt, calcium sulfate equal to from about 10 to about 50 parts by weight of said sulfate salt, ammonium sulfate equal to from about 1 to about 20 parts by weight of said sulfate salt, and ferrous sulfate equal to from about 5 to about 35 parts by weight of said sulfate salt.

9. The bioremediation solution of claim 7 wherein the iron derivative is a mixture comprised of from about 20 to about 80 parts by weight of the chelated iron ligands, from about 10 to about 30 parts by weight of citrated iron, from about 1 to about 20 parts by weight of electrolytic iron, and from about 10 about 30 parts by weight of ferrous sulfate.

10. The bioremediation solution of claim 7 further comprising an amount of compost, said compost equaling from about 10 to about 15 percent per total cubic yards of the contaminated soil to be remediated.

11. The bioremediation solution of claim 7 further comprising an amount of sodium chloride equal to about 0.5 grams per liter of the bioremediation solution.

\* \* \* \* \*

UNITED STATES PATENT AND TRADEMARK OFFICE
CERTIFICATE OF CORRECTION

PATENT NO. : 5,766,929
DATED : June 16, 1998
INVENTOR(S) : John J. Orolin, et al It is certified that error appears in the above-identified patent and that said Letters Patent is hereby corrected as shown below:

Col. 10, line 29, "*prolophormiae/ramosus*" should be -- *protophormiae/ramosus* --.

Col. 10, line 30, "*Pseudomonasfluorescens*" should be -- *Pseudomonas fluorescens* --.

Col. 11, line 34, "1,1 -dichloroethane" should be -- 1,1-dichloroethane --.

Col. 12, line 11, "1,1,1 -trichloroethane" should be -- 1,1,1-trichloroethane --.

Col. 15, line 27, "*Pseudomonasfluorescens*" should be -- *Pseudomonas fluorescens* --.

Col. 15, line 30, "A,*Bacillus*" should be -- A, *Bacillus* -- .

Col. 19, line 13, "*azoloformans*" should be -- *azotoformans* -- .

Signed and Sealed this

Thirteenth Day of October 1998

Attest:

BRUCE LEHMAN

Attesting Officer

Commissioner of Patents and Trademarks